May 20, 1930.  H. R. SMALLEY  1,759,172
GAITING HARNESS
Filed June 12, 1929    2 Sheets-Sheet 1

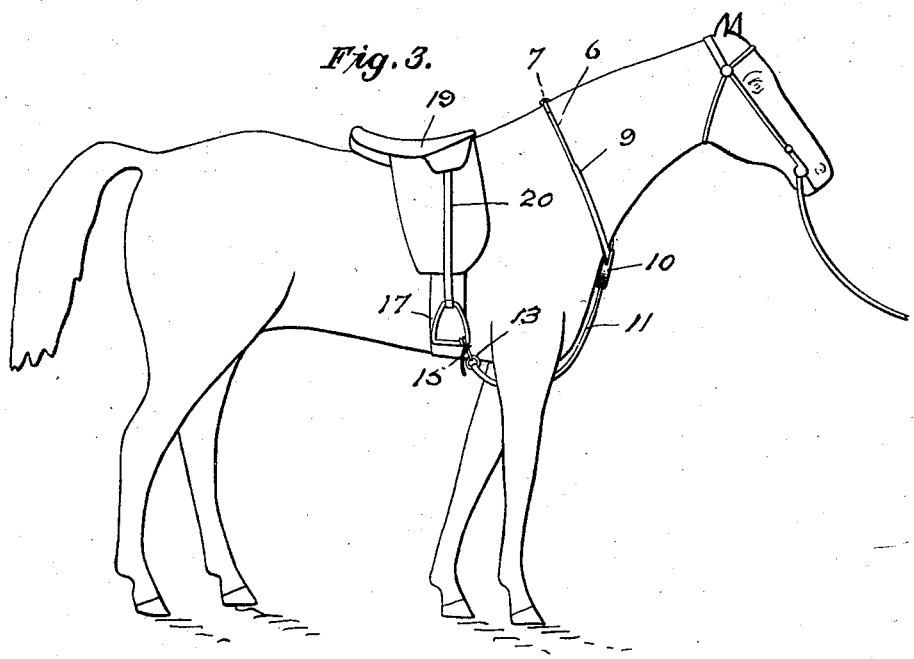
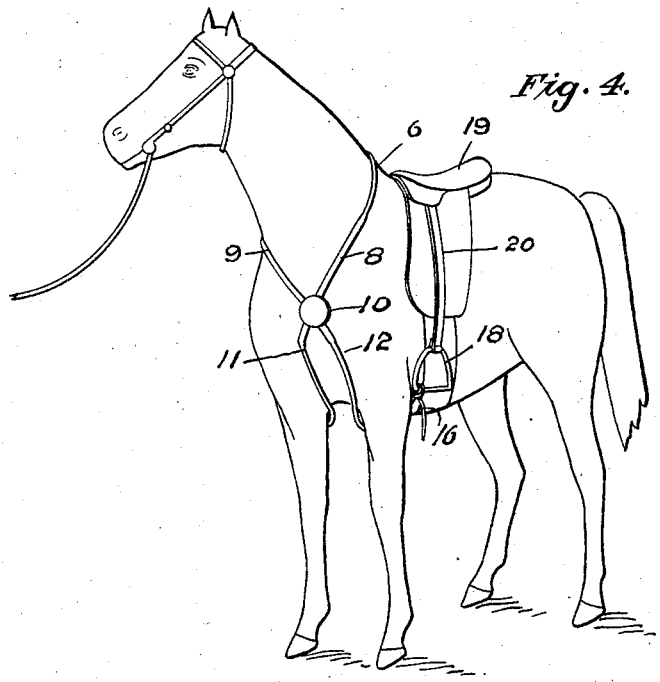

Patented May 20, 1930

1,759,172

UNITED STATES PATENT OFFICE

HENRY R. SMALLEY, OF THE UNITED STATES ARMY, WASHINGTON, DISTRICT OF COLUMBIA

GAITING HARNESS

Application filed June 12, 1929. Serial No. 370,165.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes without payment of any royalty thereon.

This invention relates to harness and more particularly to an automatic gaiting or developing device for animals such as horses having under-developed shoulders, which causes over-reaching of the hind feet, interference and a sluggish tiring and unsatisfactory gait that is especially noticeable under the saddle.

An object of this invention is to provide a simple, durable and inexpensive gaiting harness for temporary use on a horse or other riding or driven animals, so arranged as to cause the animal to properly time the lift of his front feet, by the development of his shoulders, said development causing an advanced and quickened action of the front feet.

A further object in view is to improve the carriage of the neck and head of the animal, which will also result from a better development of his shoulders.

Another object is to provide a device that is automatically and positively operated by the action of the front legs and neck of the animal in any gait, thus eliminating the human element and enabling the use of the device on an animal without a rider.

Another object being to provide a device that will apply a gentle, undamaging prod or reminder at such a point, and at such a time as will cause the animal to promptly lift his leg, said practice being quickly adopted by the animal as its usual gait, when the harness may be removed and the training ceases.

This and other objects in view will appear in the following description and be finally pointed out in the claims, it being understood that slight changes in the form and minor details of construction may be resorted to without departing from the spirit of the invention.

Similar numerals indicate corresponding parts in all the figures of the drawings in which:

Fig. 3 is an outline side view of a horse under the saddle showing the improved gaiting harness in place.

Fig. 4 is a perspective view showing the harness in place.

All good performance by either a riding or driven animal comes from proper relative distribution of weight and work between the fore and the hind quarters. Whether from the results of his confined domestic existence, the influence of the grazing period or a natural tendency to grow and develop more rapidly in the hind quarters, the limiting factor in training is the development of the shoulders. The basic defect of under-developed shoulders is apparent in all gaits and illustrations of and reference to one e. g. the trot and its remedy will be sufficient.

Heretofore the proper development of a horse having underdeveloped shoulders has been at the cost of considerable time and expense and requiring the services of one fully informed on the subject, due in part to the element of human skill, the latter in the present invention being entirely eliminated, which permits the successful use of the device by those having little or no scientific knowledge on the subject of horse training.

Figure 1:
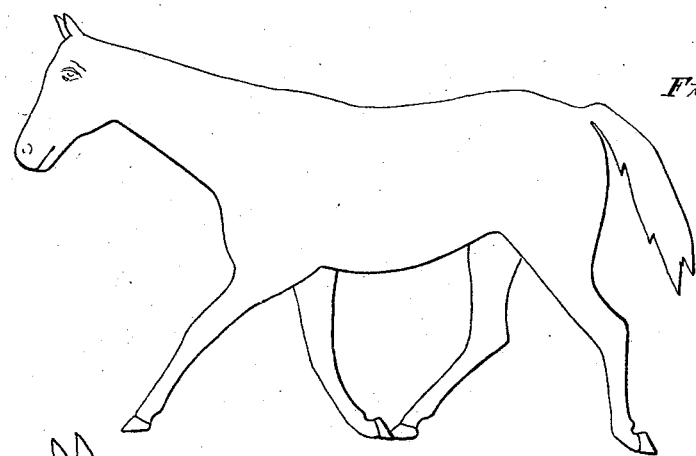
Fig. 1 is an outline view showing what the action of a young horse is apt to be, without special attention to the development of his shoulders, showing the defect known as over-reaching and poor position of the neck and head.
Figure 2:
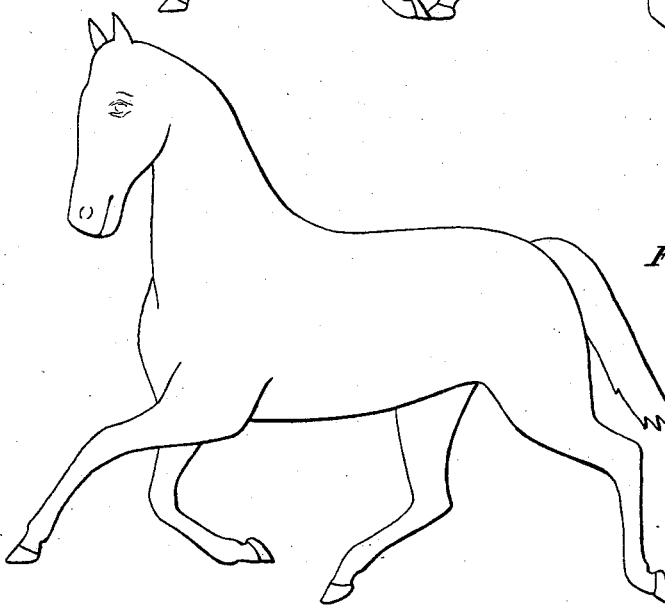
Fig. 2 is a similar view showing an animal having the proper shoulder development, action of the front feet, their position relative to the hind feet and position and the neck and head.
Figure 5:
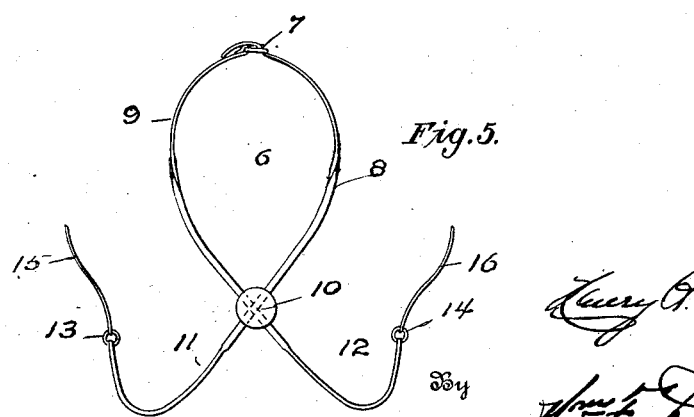
Fig. 5 is an enlarged detail view of the improved gaiting harness removed from the animal.

By reference to Fig. 5 the device consists of a neck loop 6, having adjusting means such as a buckle 7 at its top, said loop being constructed of leather or any other suitable flexible material, comprising straps adapted to encircle the neck of the animal as seen in Fig. 3.

The straps 8 and 9 on the left and right sides of the neck respectively, cross in a sliding keeper 10 at the chest of the animal and are adjustable therein.

The lower portions of said straps 8 and 9, as seen at 11 and 12 are preferably of half-round leather to provide the desired strength with diminished width. Said half-round portions terminating in loops, or being secured in rings 13 and 14.

Extending from rings 13 and 14 are raw hide thongs or straps 15 and 16 adapted to be attached to stirrups 17 and 18 on the right and left sides respectively, of the animal, the ends of said thongs or straps 15 and 16 hang below the stirrup and function in a manner to be described later.

Said stirrup may be of any preferred construction suspended by strap on the saddle 19, in the usual manner as shown at 20.

After a few lessons in teaching the animal to go on a circle in either direction on a longe, the saddle is put on with the stirrups adjusted to bring the tread thereof just above the elbow of the animal.

The gaiting device is then adjusted in place as shown in the accompanying drawings with the loop 6 around the neck of the animal, strap 8 on the left side of the neck passing through keeper 10, down between the fore legs of the animal and is attached to the right stirrup. In a similar manner the strap 9 on the right of the neck, passes through keeper 10, down between the fore legs of the animal and is attached to the left stirrup. The adjustment of the parts should permit drawing the stirrup to the rear a sufficient distance to clear the girth.

The animal is again worked on the longe, when the gaiter will limit the swing of the stirrup and at the time that the foot should be raised, the stirrup and the extension of the attaching thong below the stirrup, is drawn forward by the action of the animal, thus causing the stirrup to strike the muscle just above the elbow of the front leg and the end of the raw hide thong or strap attached to the stirrup, is caused to touch the back of the leg adjacent to the elbow.

By said means the animal is induced to step more quickly and actively with his front feet, with the resultant muscular development of the fore hand, and the symmetrical and properly synchronized action of the fore and hind quarters. Said improved action induced as described, is the lightest and easiest form of locomotion and the animal quickly adopts it due to its greater ease and comfort and also as a consequence of better shoulder development and the ability to use said improved gait.

After a preliminary training over a short period without a rider is completed, the development of the shoulders will permit mounted work without the usual handicap of delayed front leg action.

Having thus fully described my invention what I desire to secure by Letters Patent is:

1. The combination with a riding saddle having stirrups, of a gaiting harness comprising a neck loop and members extending from the loop connected with the stirrups, said parts adapted at all gaits of the animal to cause the stirrups to alternately contact with the legs of the animal and cause him to properly and fully lift his feet.

2. The combination with a riding saddle having stirrups, adjusted adjacent to the elbow of the animal, of a gaiting harness comprising a neck loop consisting of flexible members adjustably secured about the neck of the animal and members extending from the loop connected with the stirrups, said parts adapted at all gaits of the animal to cause the stirrups to alternately contact with the legs of the animal and cause him to promptly and fully lift his feet.

3. The combination with a riding saddle having stirrups, of a gaiting harness comprising a neck loop consisting of flexible members adjustably connected at the crest of the neck and at the chest of the animal and members extending from the loop connected with the stirrups, said parts adapted at all gaits of the animal to cause the stirrups to alternately contact with the legs of the animal and cause greater activity of the front legs.

4. The combination with a riding saddle having stirrups, of a gaiting harness comprising a neck loop consisting of flexible members adjustably secured together over the neck of the animal, a keeper arranged at the chest of the animal, said flexible members crossing and adjustably mounted in said keeper and adapted to adjust the size of the loop, said members connected with the stirrups, and adapted at all gaits of the animal to cause the stirrups to alternately contact with the legs of the animal to cause him to lift his legs at the proper time.

5. The combination with a saddle having stirrups, of a gaiting harness comprising a neck loop, members extending from said loop between the front legs of the animal, attaching members extending from said extensions adapted to be secured to the stirrups and hang beneath same, said parts at all gaits of the animal adapted to cause the stirrups and said attaching members to alternately come into contact with the legs of the animal at the time the leg should be lifted.

6. The combination with a riding saddle having stirrups, of a gaiting harness for animals, comprising a neck loop, members extending from the neck loop between the front legs of the animal and secured to the stirrups, and extensions from said members hanging loosely from the stirrups, adapted to cause the stirrups and said extensions, at all gaits of the animal, to alternately strike the upper part of the front leg of the animal and cause him to promptly lift his feet.

7. The combination with a saddle having stirrups, of a gaiting harness comprising flexible members adjustably secured together at the crest of the neck of the animal, extending down opposite sides of the neck, across his chest, between the front legs and secured to the stirrups, adapted at all gaits of the animal to cause the stirrups to alternately come into contact with the legs of the animal adjacent the elbow at the time the leg should be lifted.

8. The combination with the usual harness of a riding or driving animal, of a gaiting harness, comprising a neck loop, flexible members extending from said loop between the front legs of the animal and secured to the usual harness directly in rear of the front legs adapted at any gait of the animal to cause a part of the harness to alternately come into contact with the leg of the animal adjacent the elbow, when the leg should be lifted.

9. The combination with a riding saddle having stirrups adjusted adjacent to the elbow of the animal, of a gaiting harness, comprising a neck loop consisting of flexible members, adjustably connected above and below the neck of the animal; a keeper arranged at the chest of the animal, said flexible members crossing and adjustably mounted therein, extensions of said flexible members passing between the front legs of the animal, attaching members secured at the ends of said extensions adapted to be connected to the stirrups and hang beneath the stirrups, said loop and extensions arranged to cause the stirrups and depending extensions of the attaching members to alternately come into contact with the elbow and that portion of the leg of the animal below said part respectively, at a time when the leg should be lifted.

HENRY R. SMALLEY.